Nov. 26, 1940.       J. COLETTI       2,223,246
JACKING APPARATUS
Filed May 20, 1940        2 Sheets-Sheet 1
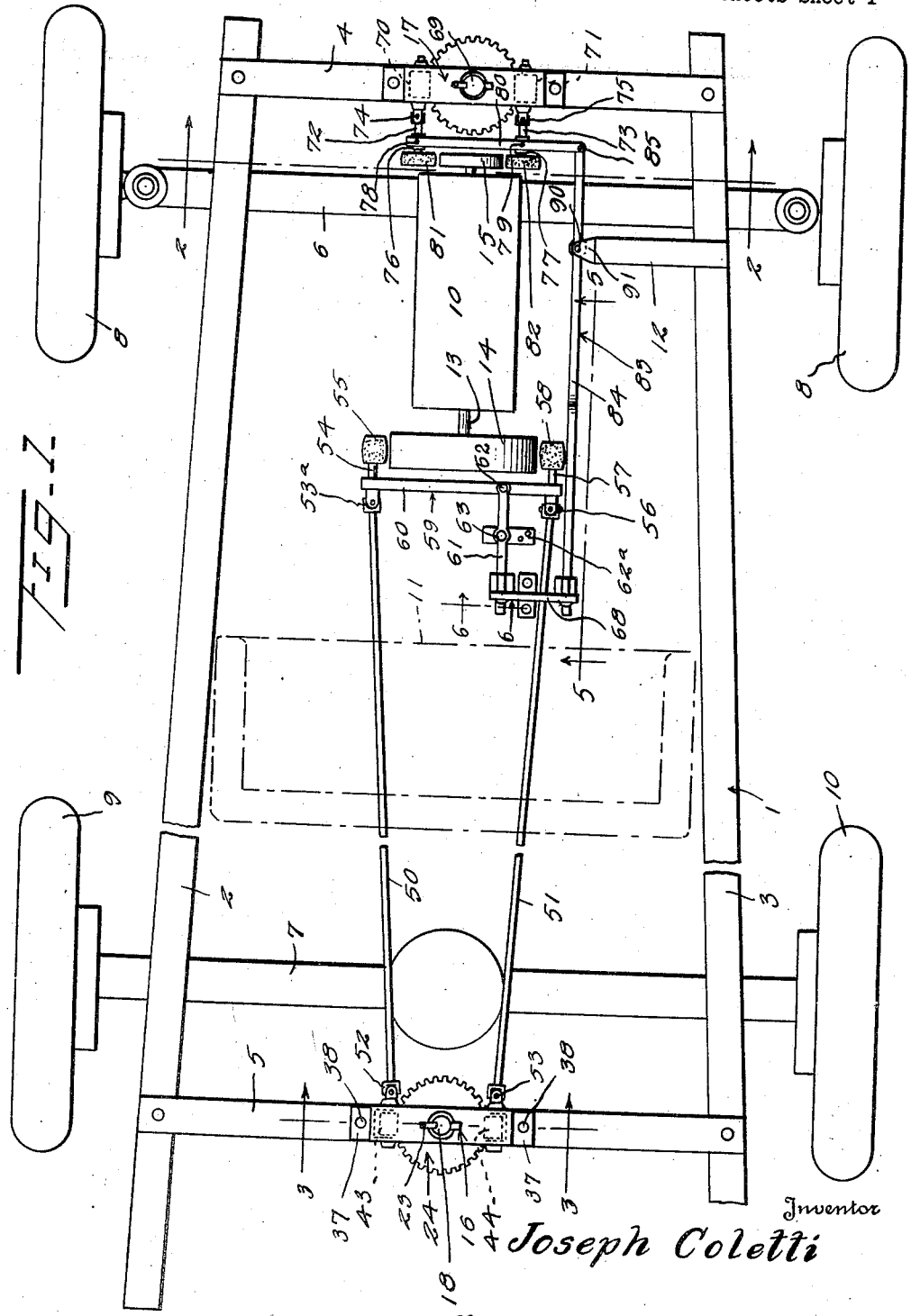
Inventor
Joseph Coletti
By Kimmel & Crowell
Attorneys Nov. 26, 1940.      J. COLETTI      2,223,246
JACKING APPARATUS
Filed May 20, 1940      2 Sheets-Sheet 2
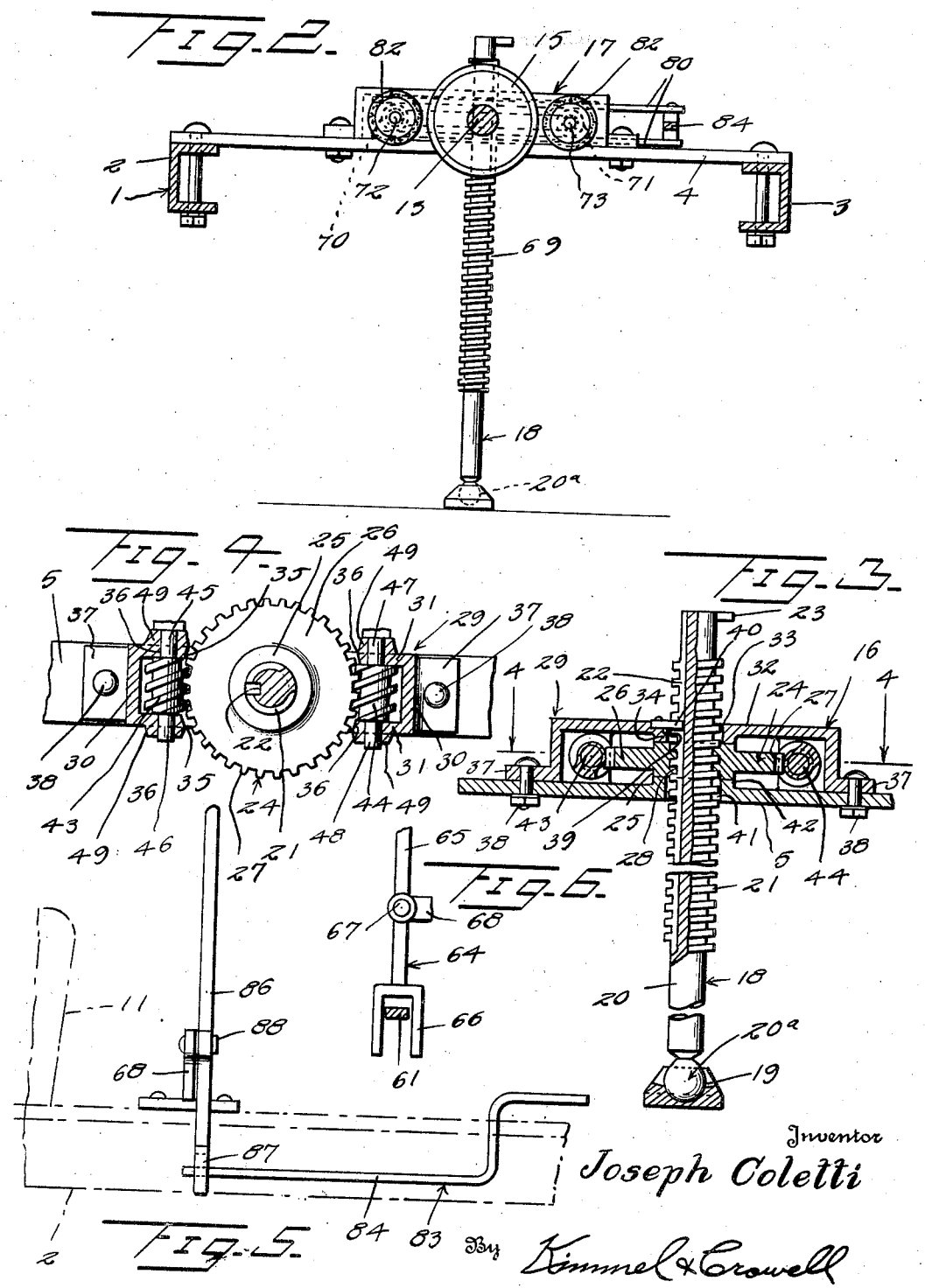
Inventor
Joseph Coletti
By Kimmel & Crowell
Attorneys Patented Nov. 26, 1940

2,223,246

UNITED STATES PATENT OFFICE 2,223,246

JACKING APPARATUS

Joseph Coletti, Norwich, Conn.

Application May 20, 1940, Serial No. 336,257

7 Claims. (Cl. 254—86)

This invention relates to a jacking apparatus designed primarily for use in connection with automobiles, but it is to be understood that an apparatus, in accordance with this invention, is for employment in any connection for which it may be found applicable.

The invention aims to provide, in a manner as hereinafter set forth, an apparatus of the class referred to carried by the automobile and including a pair of normally inactive independently controlled jacking mechanisms, one arranged below the front and the other below the rear of the body of the car and capable of being driven from the engine of the automobile for elevating and lowering the car at its front and rear and for jacking up the automobile after it has been lifted to the desired extent.

The invention further aims to provide, in a manner as hereinafter set forth, a jacking apparatus for the front and rear of an automobile and operated from the engine of the latter and conveniently controlled from the interior of the vehicle.

The invention further aims to provide, in a manner as hereinafter set forth, a jacking apparatus for the purpose referred to which is comparatively simple in its construction, strong, durable, compact, readily installed with respect to an automobile and carried by the latter, thoroughly efficient in its uses, expeditiously controlled for car lifting and lowering purposes, and comparatively inexpensive to manufacture.

Embodying the aims aforesaid and others which may hereinafter appear, the invention consists of the novel construction, combination and arrangement of parts as will be more specifically described and illustrated in the drawings, wherein is shown an embodiment of the invention, but it is to be understood that changes, variations and modifications may be resorted to which fall within the scope of the invention as claimed.

In the drawings:

Figure 1 is a top plan view illustrating in full lines the chassis, front and rear axles, front and rear wheels and the engine of an automobile; in dotted lines the front seat of the vehicle, and in full lines the jacking apparatus in accordance with this invention installed with respect to said chassis and engine. The chassis and the apparatus are broken away, Figure 2 is a vertical section on line 2—2 Figure 1 upon an enlarged scale, Figure 3 is a vertical section on line 3—3 Figure 1 upon an enlarged scale, Figure 4 is a sectional plan on line 4—4 Figure 3, Figure 5 is a fragmentary view in side elevation of the shifter device for the controller for the forward jacking mechanism, and Figure 6 is a vertical section on line 6—6 Figure 1.

With reference to the drawings, 1 generally indicates the vehicle's chassis which includes side bars 2, 3 and front and rear cross bars 4, 5 respectively. The front and rear axles of the vehicle are designated 6, 7 respectively; the front and rear wheels at 8, 9 respectively; the engine at 10 and the front seat at 11. The forward part of chassis side bar 3 has secured thereto an inwardly extending arm 12 for a purpose to be referred to. The shaft and fly wheel of the engine are designated 13, 14 respectively. The shaft 13 extends forwardly of the engine and has attached to said forward end a friction gear 15 of less diameter than the fly wheel.

The apparatus includes a rearwardly arranged section including a rear jacking mechanism 16 for elevating and lowering the back of the automobile, and a forwardly arranged section including a front jacking mechanism 17 for elevating and lowering the front of the automobile. The fly wheel provides an operator for the mechanism 16, and the friction gear 15 constitutes an operator for the mechanism 17.

The mechanism 16 includes a vertically adjustable oppositely revoluble one-piece jack member 18 formed of an enlarged foot piece 19 and an upwardly extending shank 20 of circular cross section. There is a ball and socket joint 20ᵃ between foot piece 19 and shank 20. The shank 20 is provided intermediate its ends with a worm 21, and it is also formed with a groove 22 extending from its upper end, through the worm and terminating at the lower end of the latter. The shank 20 at its upper end diametrically opposite the upper end of the groove 22 is to have attached thereto, after the jack member 18 is arranged relative to the parts of the mechanism 16, which vertically shifts it, a laterally disposed stop 23 to limit the extent of the lowering movement of the shank.

There is correlated with the jack member 18 for the purpose of elevating and lowering the back of the automobile an oppositely revoluble horizontally disposed worm gear 24 through which extends the worm 21 on shank 20. The gear 24 has its hub indicated at 25, its web at 26 and its teeth 27, which are on the outer edge of the web 26. The latter is of less thickness than the length of the hub. The web 26 is integral with the outer periphery and is disposed intermediate the ends of the hub. The web 26 encompasses the hub and it is of circular form. The hub 25 encompasses the worm 21 and has its inner face formed throughout with threads 28 which engage the threads of the worm 21.

The mechanism 16 includes a casting 29 which is mounted upon and secured to the rear cross bar 5 of the chassis. The casting 29 is in the form of an open bottom housing having side walls 20, front and rear walls 31 and a top wall 32. The latter is formed axially thereof with an opening 33 and also with a depending collar 34 on its lower face forming a continuation of the wall of opening 33. The front and rear walls 31 are provided with lengthwise disposed aligned slots 35 and an opening 36 adjacent each end of each of said slots 35. The side walls 30 at their lower ends are formed with oppositely extending apertured flanges 37 for the passage of holdfast means 38 to fixedly secure the casting 29 upon the chassis cross bar 5. The top wall 32 of casting 29 is formed in its upper surface with a mortise 39 bordering and communicating with the opening 33. Arranged within the mortise 39 and secured to wall 32 is a retainer or key 40, which is of a length to extend and slide in the groove 22 of shank 20 and prevents the jack member 18 from revolving with the gear 24. The cross bar 5 of the chassis is formed with an opening 41 which aligns with the opening 33. The bar 5 is provided on its upper face with a collar 42 which forms a continuation of the wall of opening 41 and aligns with the collar 34. The gear 24 is arranged in the casting 29 with its hub 25 interposed between and bearing against the collars 34, 42. The collars arrest the vertical movement of the gear 24 relative to the casting 29 and the cross bar 5. The gear 34 is of a diameter that when it is mounted in the casting 29 it will project forwardly and rearwardly from the latter through the slots 35 in the front and rear walls 31.

Arranged within the casting 29 and disposed on opposite sides of and meshing with the teeth of the gear 24 is a pair of revoluble worms 43, 44. The worm 43 has oppositely disposed short spindles 45, 46. The worm 44 has oppositely disposed short spindles 47, 48. The spindles 45, 47 extend forwardly through the openings 36 in the front wall 33. The spindles 46, 48 extend rearwardly through the openings 36 in the rear wall 33. The said several spindles carry means, as indicated at 49, engageable with the front and rear walls 33 to constitute thrust washers.

There is correlated with the mechanism 16 for the purpose of operating the worms 43, 44 a pair of revoluble power transmission shafts 50, 51 respectively. A universal joint connection 52 is disposed between the rear end of shaft 50 and the spindle 45. A universal joint connection 53 is arranged between the rear end of shaft 51 and the spindle 47. The forward end of shaft 50 is universally connected, as at 53ª to the rear end of a driving shaft 54, therefor. The forward end of shaft 54 carries a friction gear or pinion 55 normally spaced from, disposed in juxtaposition to one side of and adapted to be moved to engage and be operated from the flywheel and to provide for the operation of the shaft 50. The forward end of the shaft 51 is universally connected, as at 56, to the rear end of a driving shaft 57 therefor. The forward end of shaft 57 carries a friction gear or pinion 58 normally spaced from, disposed in juxtaposition to the other side of and adapted to be moved to engage and be operated from the flywheel 4 to provide for the operation of shaft 51.

Common to the shafts 54, 57 is a controller 59 therefor consisting of a combined bearing and shifter member 60 arranged rearwardly of the fly wheel 4 and a rearwardly directed shifting lever 61 for member 60. The forward end of lever 61 is pivotally connected, as at 62, to said member 60 between its transverse median and one of its ends. The lever 61 is pivotally mounted, intermediate its ends upon a support 62ª, as at 63. The support 62ª is to be suitably connected to the floor of the car body. The shafts 54, 57 extend rearwardly through the member 60 in proximity to the ends of the latter.

The lever 61 is selectively shifted in opposite directions by a vertically disposed pivoted shifter 64 which extends up into the car body. The shifter 64 consists of a vertically disposed rod 65 provided at its lower end with a fork 66 which straddles the lever 61 (Figure 6). The rod 65 is pivotally connected, intermediate its ends, as at 67, to a support 68 suitably attached to the floor of the car body. The upper end of rod 65 is arranged in convenient reach of an occupant of the front seat 11.

The elements of the front jacking mechanism 17 are of the same form, operate in a like manner as the elements of the rear jacking mechanism 16 and it is thought unnecessary to specifically describe them. The mechanism 17 is secured upon the front chassis cross bar 6. The latter is of the same form as the bar 5. The jack member of the mechanism 17 is indicated at 69 and its worms at 70, 71.

There is correlated with the mechanism 17 for the purpose of operating the worms 70, 71 a pair of revoluble power transmitting shafts 72, 73 respectively, which are universally connected at their forward ends to the rear of the worms 70, 71 respectively, as at 74, 75 respectively. The shafts 72, 73 extend rearwardly through bearings 76, 77 respectively pivotally suspended, as at 78, 79 respectively, from a controller 80 in a form of a bar or lever for selectively shifting the shafts 72, 73. Secured to the rear ends of the shafts 72, 73 are friction gears or pinions 81, 82 respectively disposed rearwardly of the controller 79. The pinions 81, 82 are disposed in juxtaposition to opposite sides of the gear 15, normally spaced from the latter and adapted to be selectively moved to engage and be operated from the gear 15 to provide for the operation of a selected shaft 72 or 73.

The controller 80 is operated by a shifter device 83 including a rearwardly extending bar 84 of substantially Z-form having its forward portion arranged at a higher level than its rear portion. The forward end of bar 84 is pivotally connected to one end of the controller 80, as at 85. The device includes a vertically disposed lever 86 having its lower end formed with a fork 87 which straddles the rear portion of bar 84. The lever 86 is pivotally supported, intermediate its ends, as at 88, to the support 68. The lever 86 extends up into the car for convenient reach of an occupant of the front seat 11. The bar 84 is pivoted, as at 90, to member 91 secured to the arm 12.

When pinion 58 is shifted to engage the fly wheel 14, during the operation of the engine 4, the worm 44 of mechanism 16 will be driven due to the connection between said worm and pinion 54, the worm 44 will then operate worm gear of mechanism 16 in a clockwise direction and due to the correlation of the worm gear with jack member 18, it will provide for the elevating of the back of the automobile and on discontinuance of the operation of pinion 58 the back of the automobile will be held in its elevated position. When pinion 55 is shifted to engage fly wheel 14, after the back of the automobile has been elevated, the worm 43 will be driven due to the connection between said worm 43 and pinion 54, the worm 43 will operate the worm gear of mechanism 16 in the opposite direction and due to the correlation of said worm gear with the jack member 18, it will provide for the lowering of the back of the automobile.

When pinion 77 is shifted to engage the gear 15, during the operation of the engine the worm 71 of mechanism 17 will be driven due to the connection between said worm and pinion 77, the worm 71 will then operate the worm gear of mechanism 17 in a clockwise direction and due to the correlation of the worm gear with jack member 69 it will provide for the elevating of the front of the automobile and on discontinuance of the operation of the pinion 77 the front of the automobile will be held in its elevated position. When pinion 76 is shifted to engage gear 15, after the front of the automobile has been elevated, the worm 70 will be driven due to the connection between such worm and pinion 76, the worm 70 will then operate the worm gear of mechanism 17 in the opposite direction and due to the correlation between the worm gear with jack member 69 it will provide for the lowering of the front of the automobile.

When the automobile is in operation on the road the pinions or gears 55, 58, 76 and 77 are releasably held in neutral position.

As the worm of each jack member is of less length than and disposed intermediate the ends of the shank a smooth or reduced portion is arranged above and below the worm and when the latter is clear of the threads of the hub of the worm gear the lifting or lowering action applied to the automobile is discontinued.

The ball and socket connection between the foot piece 19 and the shank 20 provides a swivel to thereby permit of the jack to be used on a grade so that the connection will not be rigid and break.

What I claim is:

1. A jacking apparatus carried by and for the front of an automotive vehicle comprising in combination, a vehicle's engine shaft provided with a drive gear at its forward end, an oppositely operable front jacking mechanism for and secured to the front of the vehicle, a normally inactive pair of selectively operable front power transmitting devices capable of being operated from said gear and operatively connected with said front mechanism for driving the latter, a shiftable front controller common to and for selectively shifting said front devices to engage with and to be operated from said gear, and universal joint connections between said front power transmitting devices and said front jacking mechanism.

2. A jacking apparatus carried by and for the rear of an automotive vehicle comprising in combination, the vehicle's engine shaft provided with a fly wheel at its rear end, an oppositely operable rear jacking mechanism for and secured to the back of the vehicle, a normally inactive pair of selectively operable rear power transmitting devices capable of being operated from said fly wheel and operatively connected with said rear mechanism for driving the latter, a shiftable rear controller common to and for selectively shifting said devices to engage with and to be operated from said fly wheel, and universal joint connections between said rear power transmitting devices and said rear jacking mechanism.

3. In a jacking apparatus for and adapted to be carried by an automotive vehicle, in combination, the vehicle's engine, a cross bar of the chassis of the vehicle, a jacking mechanism secured upon said cross bar including a vertically movable lengthwise grooved jack member, a worm gear mounted about and having threaded engagement with said jack, a pair of worms located on opposite sides of and engaged with the teeth of the gear for revolving the latter to provide for selectively moving said member in opposite directions, a fixed key slidable in said groove, and a controlling means operated from the engine of the vehicle for selectively operating said worms.

4. The invention as set forth by claim 1 having combined therewith a lever for shifting said controller in opposite directions.

5. The invention as set forth by claim 2 having combined therewith a lever for shifting said controller in opposite directions.

6. A jacking apparatus for mounting on a vehicle and operated by the engine of the latter, comprising a jack screw, a horizontally rotatable worm gear threadably engaging said screw, a pair of diametrically opposed worms meshing with said worm gear, a pair of worm operating shafts, means disposed adjacent the ends of said shafts opposite from said worms for holding said shafts in spaced apart relation and on diametrically opposite sides of a rotatable part of the engine constituting a jack drive member, a driven member carried by the said opposite end of each shaft, and means for shifting said shaft holding means to thereby effect engagement of a selected driven member with said drive member for rotating a selected shaft in the desired direction.

7. A jacking apparatus for mounting on an automotive vehicle and for operating from the engine of the vehicle, said apparatus including a jack screw, a horizontally rotatable worm gear threadedly engaging with said screw, a pair of normally inactive diametrically opposed worms for selectively meshing with said worm gear for rotating the latter to vertically move said screw, a pair of normally inactive oppositely revoluble shafts for selectively operating said worms, a normally inactive driving means for and universally connected to each shaft, a controller common to said pair of driving means for selectively shifting a driving means to a position to be operated from the engine of the vehicle, and a lever for shifting said controller in opposite directions.

JOSEPH COLETTI.